United States Patent [19]

Rise

[11] 3,713,765
[45] Jan. 30, 1973

[54] DIFFERENTIAL PRESSURE THERMOFORMING APPARATUS FOR FORMING LARGE ARTICLES SUCH AS TRAILER BODIES AND BOATS

[75] Inventor: Donald J. Rise, Box 321, Mount Pleasant, Mich. 48858

[22] Filed: Oct. 22, 1970

[21] Appl. No.: 83,099

[52] U.S. Cl. .................................. 425/384, 425/388
[51] Int. Cl. ............................................. B29c 17/00
[58] Field of Search ............................. 18/19 F, 19 P

[56] References Cited

UNITED STATES PATENTS

| | | | |
|---|---|---|---|
| 2,952,875 | 9/1960 | Herrick | 18/19 F |
| 3,568,253 | 3/1971 | Schwartz et al. | 18/19 F |
| 3,307,222 | 3/1967 | Baldwin et al. | 18/19 F |
| 3,600,753 | 8/1971 | Otto | 18/19 F |
| 2,160,182 | 5/1939 | Vrooman | 18/19 F |
| 3,007,206 | 11/1961 | Griswold | 18/19 F UX |
| 3,377,656 | 4/1968 | Tilden | 18/19 F |
| 3,566,650 | 3/1971 | Johnson | 18/19 F X |
| 3,597,799 | 8/1971 | Earle | 18/19 F X |
| 3,341,895 | 9/1967 | Sheby | 18/19 F |
| 3,441,983 | 5/1969 | Cheney | 18/19 F |
| 3,543,335 | 12/1970 | Meyer | 18/19 P X |
| 3,540,113 | 11/1970 | Krutzikowsky | 18/19 F X |
| 3,267,521 | 8/1966 | Kostur | 18/19 F |

Primary Examiner—J. Howard Flint, Jr.
Attorney—Learman & McCulloch

[57] ABSTRACT

Differential pressure thermoforming apparatus for forming large articles such as trailer bodies and boats in relatively thin sheets of thermoplastic material comprising a sheet supporting box frame for clamping the edge portions of a sheet of thermoplastic material and defining a cavity spanned by the clamped sheet. Load assist bars are disposed in the cavity to initially support the mid-portion of the thermoplastic sheet while it is being clamped on the frame and then fluid under pressure is admitted to the cavity to lift the midportion of the sheet upwardly off the bars. A sheet heating oven is mounted laterally adjacent one side of the mold box frame and is movable into superposed relation with the box frame where it is then tilted so that the sheet carried thereby is heated to a substantially uniform temperature. The clamped sheet, having its mid-portion supported by fluid pressure, is then moved upwardly toward a differential pressure mold to form a shape in the sheet of material. Doors are provided on the sides of the mold box frame and are opened to exhaust cooling air which is introduced to the cavity. After the shape is formed and the mold box frame is moved away from the mold, the load assist bars function to eject the molded part from the frame.

22 Claims, 8 Drawing Figures

DIFFERENTIAL PRESSURE THERMOFORMING APPARATUS FOR FORMING LARGE ARTICLES SUCH AS TRAILER BODIES AND BOATS

FIELD OF THE INVENTION

This invention relates to differential pressure thermoforming machines for forming shapes in thin sheets of thermoplastic material by reverse drape molding, and more particularly, to new and improved apparatus for handling and supporting and heating relatively thin sheets of thermoplastic material, and new and improved apparatus for cooling the parts formed in the sheets.

BACKGROUND OF THE INVENTION

Thermoforming machines of the type disclosed herein commonly employ a sheet heating apparatus or bank disposed above and/or below the level of the plastic sheet of material in order to bring the plastic to the forming temperature. In some machines the heating oven is moved from a remote position over to a position above the sheet or web and, before and after the oven is moved above or below the sheet of material, it is adjacent one side of the sheet so that one side of the thermoplastic sheet is heated to a higher temperature than the other side. Thus, when the heating array is brought into superposed relation with the plastic sheet, all portions of the sheet do not reach the forming temperature at the same time. It is an object of the present invention, therefore, to provide differential pressure thermoforming machines having a tiltable heating bank to heat the sheet of thermoplastic material, in which a shape is to be formed, to a substantially uniform temperature.

Thin sheets of thermoplastic material have relatively little "hot strength." When a thin sheet of thermoplastic material is clamped along its edges and used for forming relatively large articles, the strength of the heated thermoplastic material is insufficient to support the mid-portion of the sheet. Accordingly, it is an object of the present invention to provide new and novel means for supporting the mid-portion of a heated thermoplastic sheet while it is being moved to a forming position.

Forming machines of this character usually employ at least one die member to form shapes in the preheated sheets of material, which naturally sag when heated. If a male die member is disposed above the sheet of material and the sheet of material is moved upwardly into engagement therewith, the sagging sheet will engage the perimetral portions of the die member before the middle portion thereof is engaged by the sheet. The sheet thus seals itself around the male die member perimeter and locks in any air therebetween. When the middle portion is subsequently brought into engagement with the male die member, the excess material overlaps and forms a double thickness webbing which detracts from the appearance and results in an article which must be scrapped.

Accordingly, it is an object of the present invention to provide differential pressure thermoforming apparatus for forming articles without the formation of center webbing caused by excessive material on a plane surface.

It is a further object of the present invention to provide a new and improved apparatus for cooling a part formed in a sheet of thermoplastic material.

Still another object of the present invention is to provide differential pressure thermoforming apparatus which includes apparatus that will support the mid-portion of the heated sheet in a sheet supporting box frame prior to the formation of a part therein and also functions to eject a part molded in the sheet.

In accordance with the present invention, there is provide differential pressure thermoforming apparatus comprising a sheet supporting box frame means including supporting means for supporting edge portions of a sheet of thermoplastic material and defining a cavity which a sheet of thermoplastic material spans when supported by the supporting means, differential pressure mold means for forming shapes in sheets of thermoplastic material, means for relatively moving the sheet supporting means and the mold means between remote and operative molding positions so that a sheet clamped on said clamping means is brought into engagement with the mold means to form a shape in said sheet, heating means for heating the sheet of thermoplastic material, and means for introducing fluid under pressure to the cavity in said mold box frame means to support the midportion of a sheet on the box frame as the sheet is being heated.

The present invention may more readily be described by reference to the accompanying drawings, in which.

Referring now more particularly to the drawings wherein a preferred embodiment of the invention is illustrated, the apparatus formed according to the invention is mounted on a frame, generally designated F, including upper and lower side rails 10 and 12 connected by vertically extending posts 14 and end members 16.

Two identical forming stations, generally designated 18 and 20, are provided on the frame F on opposite sides of a central station 22. There is a movable heater assembly 24 which is movable from the central station 22 alternately to the forming stations 18 and 20.

Spanning the side rails 10 in each of the mold stations 18 and 20 are pairs of eye beams 26 which support a stationary platen 28 mounting a male mold 29. Vacuum ports 30 are provided in the mold 29 and are adapted to selectively communicate with a suitable vacuum source (not shown), for creating a differential pressure on opposite sides of a sheet of thermoplastic material brought into engagement with the male mold 29, and an air pressure source (not shown) for ejecting the molded parts therefrom.

Provided at each of the forming stations 18 and 20 is a vertically movable plastic sheet supporting sealed box frame, generally designated 32, including a pair of side walls 36 connected by a pair of end walls 34 and a pair of intermediate wall cross members 35. The walls 35 and 36 include upper inwardly extending terminal flange portions 38 providing supporting surfaces for a sheet of thermoplastic material P which is clamped on the flange portions 38 by a plurality of solenoid actuated, pneumatic cylinders 40 supported on support members 42 (FIG. 7) extending outwardly of the wall members 35 and 36. Sheet clamping bars 44 are connected with one end of at least one of a plurality of bell cranks 46 which are pivoted on the support 42 at 48 and connected at their opposite ends with the piston rods 40a of the cylinders 40. Typical sheets of thermoplastic P utilized are of the ABS type and are 88 inches wide by 158 inches long and have a thickness typically ranging between 0.070–0.150 inches.

Figure 3:
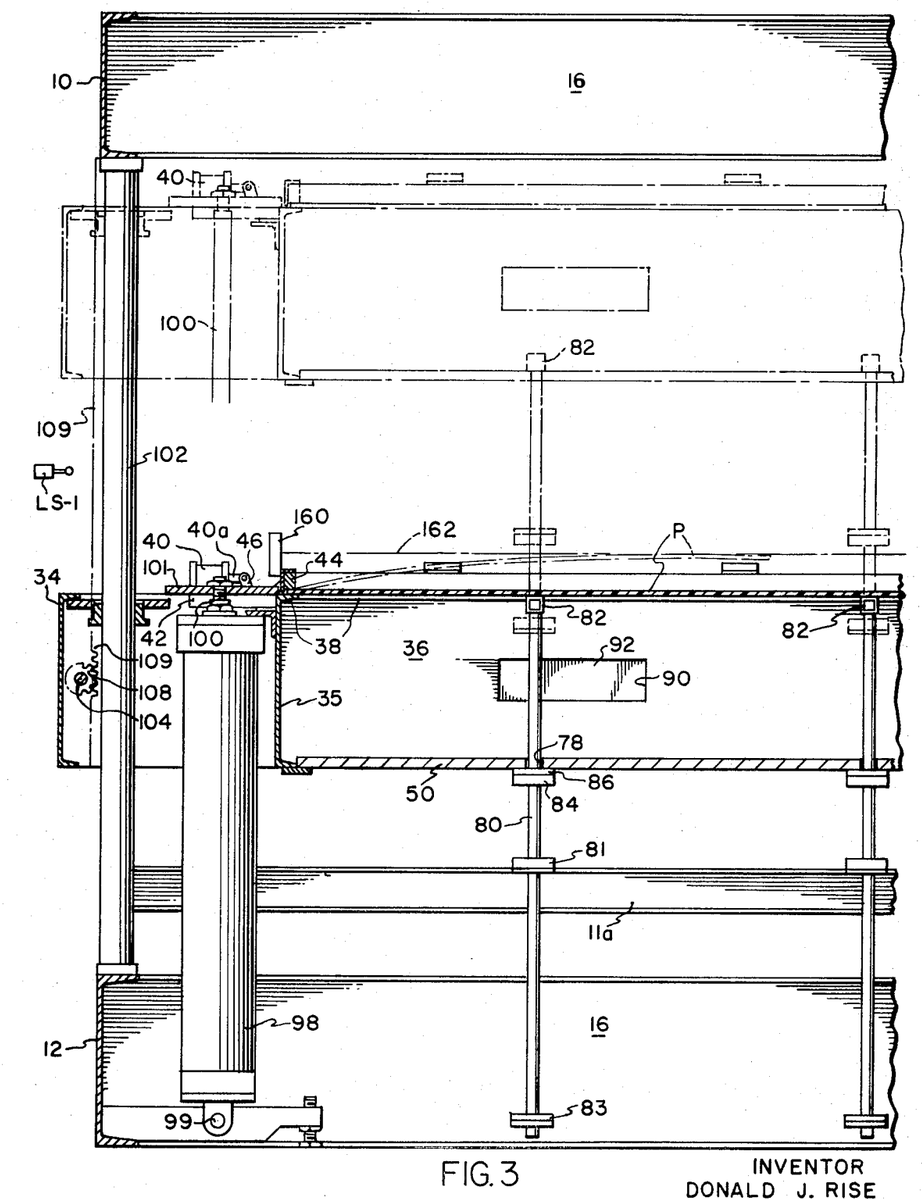
FIG. 3 is a sectional end view taken along the line 3—3 of FIG. 2.

The sheet supporting box frame 32, which is mounted for vertical movement along guide rods 102, is provided with a bottom wall 50 spanning the walls 35 and 36. A plurality of bores 78 are provided at opposite ends of the bottom wall 50 and slidably receive a pair of supporting rods 80 which threadedly receive stop members 81 that rest on channel member 11a in their lowermost position, as shown in FIG. 3, and mount, at their upper ends, crosswisely extending load assist bars 82 at 30–40 inch intervals for supporting a sheet of plastic P clamped on the side frame members 35 and 36. The rods 80 also threadedly receive stop members 84 provided with resilient foam cushion pads 86 on the upper surfaces thereof for engaging the bottom wall 50 and sealing the openings 78 around the rods 80 when the mold box frame 32 is in the solid line position shown in FIG. 3. At their lower ends the rods 80 also threadedly receive stop members 83 for engaging the channel members 11a as the rods 80 are moved upwardly to limit the vertical movement of the rods 80.

For raising the plastic sheet P off the load assist bars 82 and supporting it in the chain line position shown in FIG. 3, the bottom wall 50 is also provided with a plurality of apertures 71 communicating with an air supply line 71a connected with a suitable source of air which is provided under a pressure of approximately 80 pounds per square inch and traveling at about 20 cubic feet per minute. Deflecting baffle plates 75 are supported over the openings 71 by pins 75a to deflect the air stream passing through the openings 71 so as to not directly impinge on the plastic sheet P so as to form cold spots therein. When a sheet P is clamped to the flanges 38 on the walls 35 and 36, a substantially air tight seal is formed so that when air is admitted to the cavity formed by the walls 34, 36 and 50, the plastic sheet P is moved upwardly to the chain line position.

Figure 4:
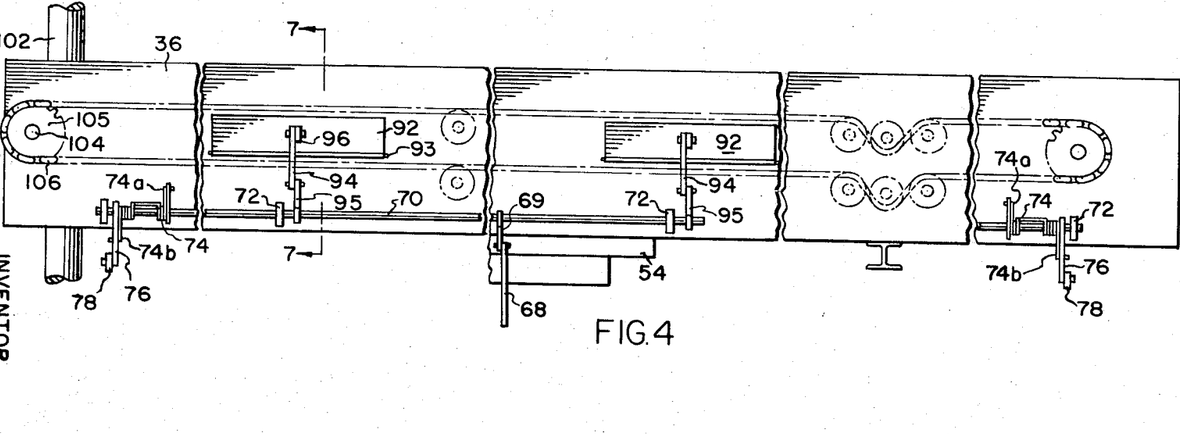
FIG. 4 is a fragmentary end elevational view, particularly illustrating the sheet supporting carriage, which is taken along the line 4—4 of FIG. 1.
Figure 6:
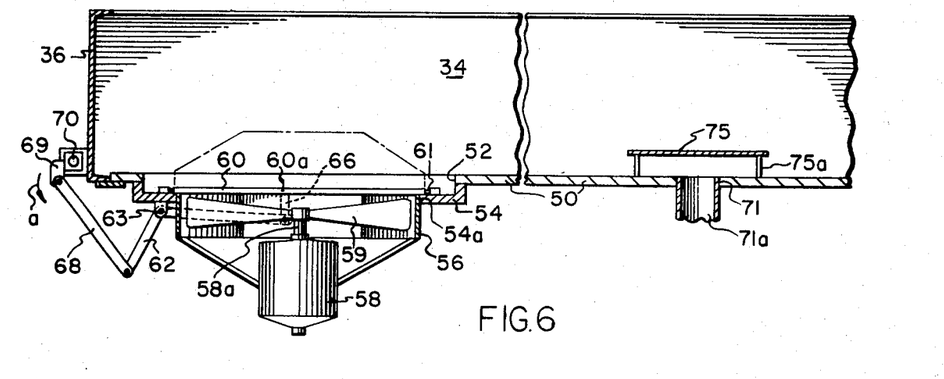
FIG. 6 is a sectional front view taken along the line 6—6 of FIG. 2 and particularly illustrating the mechanism for cooling the parts formed.

For admitting cooling air to the cavity in the mold box frame to cool a part formed in the plastic sheet P, a plurality of openings 52 are provided in the bottom wall 50 and are spanned by frame members 54 disposed below the wall 50. Octagonally shaped openings 54a are provided in the frame members 54 and receive octagonally shaped shrouds 56 which mount fan driving motors 58 having fan blades 59 mounted on the terminal ends of the motor shafts 58a. Pairs of doors 60, pivotally mounted on pairs of shafts 61 and spanning the octagonally shaped shrouds 56, are provided to close the octagonally shaped openings defined by the shrouds 56. The doors 60 are pivoted from the solid line positions shown in FIG. 6 to the chain line positions, also shown in FIG. 6, by bell cranks 62 positioned on opposite sides of the shrouds 56 and pivoted on pivot pins 63 provided on the frame member 54. One end of each bell crank 62 is connected with the portion 60a of each of the doors 60 by a link 66 passing through a suitable opening in the bottom wall 50. Links 68 connect the opposite ends of the bell crank arms 62 with blocks 69 fixed to a pair of shafts 70 which are journaled in suitable bearing blocks 72 attached to the box frame walls 36. Torsion springs 74 (FIG. 4) are placed on the shafts 70 and one end 74a of each torsion spring is suitably fixed to the wall 36 and the opposite end 74b of each torsion spring is engaged with a link 76 fixed at one end to the shaft 70 and mounting at its other end a cam follower roller 78. As the sheet supporting box 32 is moved upwardly from the position shown in FIG. 1, in a manner to be later described, the cam follower rollers 78 engage stationary cam members 79 (FIG. 2) provided on the upper side frame members 14 so as to pivot the shafts 70 (see the arrow a in FIG. 6) to move the doors 60 from the solid line positions shown in FIG. 6, to the chain line positions also shown in FIG. 6. The fan motors 58 are then energized in a manner which will be later described to draw cooling air into the sealed cavity formed by the walls 34, 35 and 50 in the mold box 32.

The side walls 36 are also provided with apertures 90 (FIG. 7) which are selectively closed by hinged doors 92 pivotally connected with the wall 36 by pivot pins 93. A plurality of links 95, which are each fixed at one end to the shafts 70, are pivotally connected with links 94 that are pivotally connected with rods 96 extending from the doors 92. When the carriage 32 is moved upwardly so that the cam follower members 78 engage the cam surfaces 79, the shafts 70 will pivot to swing the doors 92 outwardly so that the cooling air introduced by the fans 59 will be exhausted through the ports 90.

Figure 1:
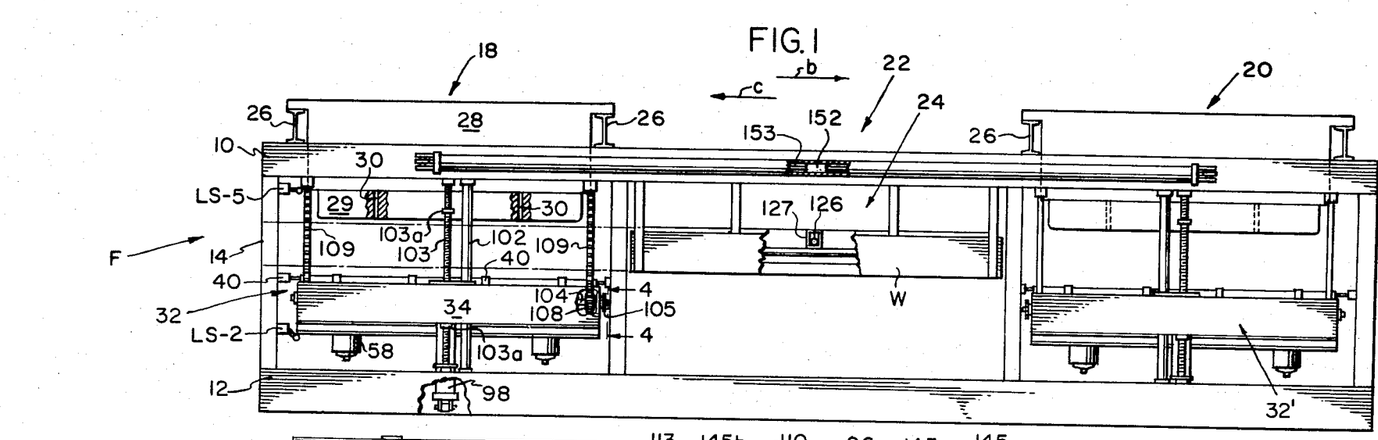
FIG. 1 is a side elevational view of the differential pressure thermoforming apparatus formed according to the invention, parts being broken away to more clearly illustrate certain portions thereof.
Figure 2:
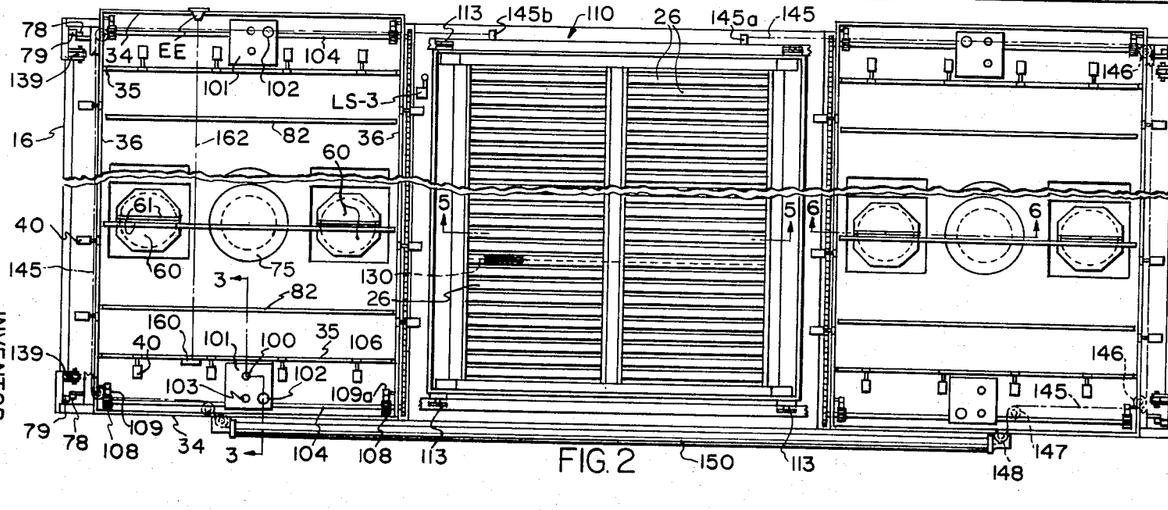
FIG. 2 is a top plan view of the apparatus illustrated in FIG. 1.

To move the carriage assembly 32 from the positions shown in FIG. 1 to raised positions adjacent the male mold 29, two solenoid actuated, spring returned, fluid operated, cylinders 98 are pivotally mounted to the frames with pivot pins 99 (FIG. 3) at each station 18 and 20, and include piston rods 100 connected with plates 101 that are welded or otherwise suitably secured to the cross frame members 34 and 35 on opposite ends of the carriage 32.

The guide rods 102, which are fixed to the upper and lower frame members 12 and 10, are slidably received in the plate 101 spanning the end rails 34 and 35. Another pair of rods 103 may suitably be journaled on the frame member F and mount suitable stop members 103a (FIG. 1) thereon to limit the upward and downward travel of the member 32 as desired.

Journaled in suitable bearings provided in the side rails 36 at opposite ends of the mold box frame 32 is a pair of shafts 104. Mounted on one end of each of the shafts 104 is a sprocket 105 having a chain 106 trained therearound. Also mounted on opposite ends of the shafts 104 are pairs of spur gears 108 (FIGS. 1 and 2) in riving engagement with racks 109 fixed to the frame F in any suitable manner such as by welding. Guide rollers 109a, which are rotatably mounted on shafts provided on the side walls 36, engage the opposite sides of the racks 109 so as to sandwich the racks 109 between the gears 108 and the guide rollers 109a. As the cylinders 98 are actuated to move the piston rods 100 from solid line positions shown in FIG. 3 to the chain line positions shown in FIG. 3, the gears 108 engage the racks 109 to drive the sprockets 105 and the chain 106 so that all sides of the box frame 32 move upwardly in unison. When the mold member 29 and the sheet clamping frame 32 are spread apart to the positions shown in FIG. 1, the heating assembly 24 is movable from the solid line position shown in FIG. 1 to the chain line position, also shown in FIG. 1, between the mold member 29 and the mold box frame 32.

The heating assembly or oven 24 comprises a horizontally movable outer main frame 110, pivotally supporting an inner frame I. The main frame 110 includes end walls 111 and side walls 112 and is supported for longitudinal movement on a pair of tracks 113, which extend the entire length of the machine, by guide wheels 115 journaled on shafts 116 provided on support bars 114 that are welded or otherwise suitably secured to the frame wall members 111 and 112. Welded to the side frame members W of the pivotal frame I are pairs of vertically extending channel shaped members 117a connected by cross members 117. Spanning the cross members 117a positioned on opposite side walls 112 are upper and lower channel shaped members 119 and 120 respectively.

The pivotal frame I includes side walls W connected by rectangularly shaped channel members 127 having a plurality of upper reinforcing cross members 125 and 126 on opposite ends thereof. A shaft 122, which passes through the middle channel member 127 and is journaled in the side walls W with bearings (not shown), is also journaled at its ends in suitable bearings (not shown) provided in the walls 112 of the main heater assembly frame 110. Extending within the tubular cross members 126 are a plurality of commercially available electrical resistance heating elements 130 (FIG. 5) adapted to be connected to a source of alternating current with suitable connectors, such as a rolling contact traveling on an electrically energized track.

To maintain the relative horizontal position of the heating oven 24, centering springs 132 are fixed to the underside of the channel members 120 by bolts 133 connected thereto by nuts 134. The springs 132 bear against the upper reinforcing members 125 to maintain the position of the inner frame I. Disposed on opposite ends of the main frame 112 above each of the cross members 127 are pairs of cam plates 138 adapted to engage the rollers 139 journaled on the cross members 16 of frame F, when the heating assembly 24 is moved from the central position 22 to either of the forming stations 18 and 20. When the rollers 139 are engaged by one of the cam plates 138 to force the oven to the chain line position shown in FIG. 5, the oven is tilted about the shaft 122 against the force of one of the springs 132. At least one shock absorber 140 is connected between the top plate 125 and the cross member 119 so that as the tilt ramp 138 is moved off the follower roller 139, the heating unit 24 does not hunt and any oscillations are quickly damped out.

To move the oven or heating unit 24 from the central station 22 to the forming stations 18 and 20, a cable 145 is connected at opposite ends 145a and 145b to the main frame 110 of the heating unit 24 and is trained around suitable pulleys 146, 147 and 148 journaled on the frame F and thence through a cylinder 150 wherein a double acting, solenoid actuated, fluid operated piston 152 is mounted and has a piston rod 153 connected with the cable 145 by suitable pin connection mechanism (not shown). As the piston 153 is moved in the direction of the arrow b, the oven assembly 24 is moved in the direction of the arrow c. Conversely, when the piston 153 is moved in the direction of the arrow c, the oven 24 is moved in a direction of the arrow b toward the forming station 20.

THE CONTROL CIRCUIT

Figure 7:
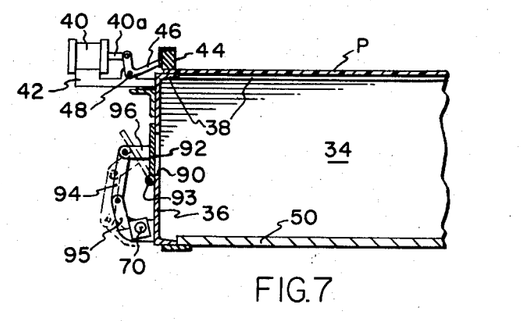
FIG. 7 is a sectional, front elevational view, taken along the line 7—7 of FIG. 4, particularly illustrating the sheet clamping structure and the door opening mechanism.
Figure 8:
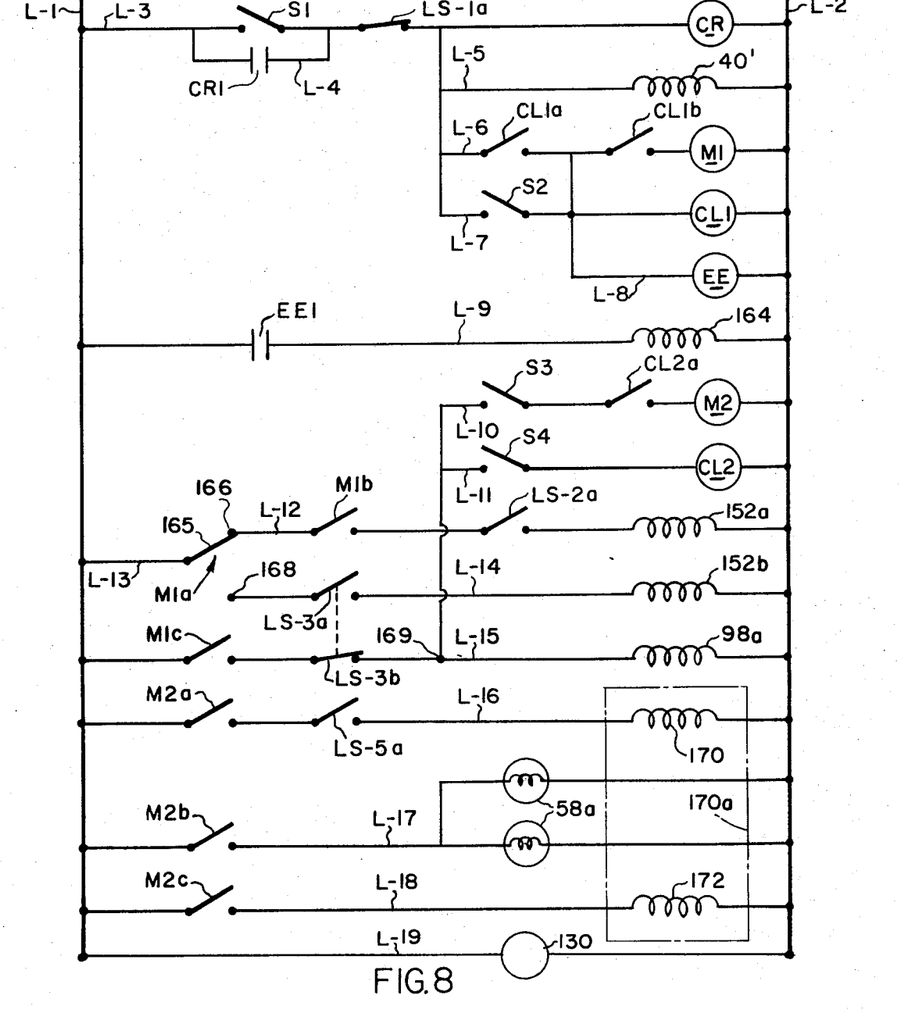
FIG. 8 is a schematic diagram of an electrical control circuit for controlling the operation of the apparatus illustrated in FIGS. 1-7.

Referring now to FIG. 8, a schematic diagram of a control circuit for operating the apparatus illustrated in FIGS. 1–7 is depicted. For purposes of clarity, only that portion of the circuit which is used to operate the heating assembly 24 in conjunction with the forming station 18, will be illustrated and described. However, it should be realized that the circuit is duplicated for the forming station 20.

The lines L–1 and L–2 are connected across a suitable source of power, such as 110 V, 60 cycle, alternating current. The circuit and sub-circuit lines connected between the lines L–1 and L–2 are designated L–3 through L–19. Starting switch members S1, S2, S3 and S4 are connected in lines L–3, L–8, L–10 and L–11, respectively. Connected in series circuit with the switch S1 in line L–3 is a holding relay CR, which is operable to close a set of normally open contacts CR1, (line L–4) connected in parallel with the switch S1, and the normally closed contacts LS–1a of a limit switch LS–1 which is mounted on the frame F and is actuated by the mold box frame 32 when the frame 32 is approximately 10 inches from its lowermost position as shown in solid lines in FIG. 3. The limit switch LS–1 is of the type which is only actuable when the mold box frame 32 is moving downwardly and is not affected when the mold box frame 32 moves upwardly. Connected in parallel with the holding relay CR in line L–5 is the advance solenoid 40' for directing fluid to the clamp advancing cylinders 40 so as to move the clamp bars 44 to the clamping position as shown in FIG. 7. When a sheet of thermoplastic material P is clamped to the frame 32, a substantially air tight enclosure is formed. The starting switch S2 is connected in series with a timer clutch CL1 for a timer motor M1 which is connected in line L–6. The timer clutch CL1, when energized, is operable to close sets of normally open contacts CL1a and CL1b connected in series circuit relation with the timer motor M1 in line L–6. Connected in parallel with the timer clutch CL1 is a photoelectric cell EE in line L-8, including a set of contacts EE1 in L-9. The photoelectric cell EE is mounted on one side of the frame 32 and includes a conventional light source for transmitting a light beam to a reflector 160 mounted on the opposite side of the frame 32 for reflecting a beam 162 (FIG. 2) to the photoelectric eye EE. The photoelectric eye EE is mounted such that the beam 162 will be interrupted when the plastic sheet P has been billowed upwardly approximately 1 ¾ inches from the solid line position shown in FIG. 3 to the chain line position also shown in FIG. 3.

The contacts EE1 which are closed when the beam 162 is transmitted without interruption, is connected in series with a air billowing control solenoid 164, which when energized, is operable to direct air to the cavity formed in the sheet supporting box 32 through the ports 72 against a deflecting plate 76. When the sheet P has billowed up to the position shown in chain lines in FIG. 3, the electric eye contacts EE1 will open to deenergize the solenoid 164.

The electrically operably timer M1, of the type manufactured by Eagle Manufacturing Co. of Moline, Illinois, under the trademark "CYCLEFLEX," includes sets of timer switch contacts M1a, M1b and M1c in lines L-13, L-12 and L-15, respectively, which close at varying times. The switch contacts M1a include a movable armature 165 which is initially in engagement with a fixed contact 166 and is operable to move into engagement with a fixed contact 168 after the motor for the timer M1 has been operating for a predetermined time. The normally open switch contacts M1b are connected to the fixed contact 166 and the normally open limit switch contacts LS-2a of a limit switch LS-2 (FIG. 1) which is actuated by the box frame 32 when it is in its lowermost position. The switch contacts M1b and LS-2a are connected in series circuit relation with the advance solenoid 152a for actuating an air valve which will permit air to flow to the piston 152 so as to move the heater carriage 24 in the direction of the arrow c to a position between the male mold member 29 and the mold box frame 32. A limit switch LS-3 mounted at the forming station 18 (FIG. 2) includes a set of normally open contacts LS-3a (line L-14) which are closed when the heating assembly 24 is moved to the forming station 18. The contacts LS-3a are connected in series with the return solenoid 152b of the cylinder 152 for moving the heater carriage 24 in the direction of the arrow b to its center position. The limit switch LS-3, when actuated, is operable to open a set of normally closed contacts LS-3b in line L-15 which are connected in series circuit relation with the timer contacts M1c and the raise solenoid 98a for actuating an air valve which will permit air to flow to the cylinder 98 so as to raise the clamp box 32 from the position shown in solid lines in FIG. 1 to the operative molding position adjacent the mold 29. Connected to the junction 169 (line L-15) is a timer clutch coil CL2 (line L-11) for the timer M2 (line L-10) and the start switch S4. When energized, the clutch coil CL2 is operable to close a set of contacts CL2a in line L-10. The start switch S3 is also connected in series circuit with the contacts CL2a and a second electrically operable forming timer motor M2, such as that made by Eagle Manufacturing Company under the trademark MULTIFLEX. The clutch coil CL2 for the timer M2 (line L-10) is connected to the junction 169 in line L-15 and is also connected in series circuit relation with the start switch S4 in line L-11. The clutch coil CL2 includes a set of normally open contacts CL2a which are closed when the clutch coil CL2 is energized. The contacts CL2a are connected in series circuit relation with the switch S3 and an electrically operable forming timer M2 which includes sets of normally open contacts M2a, M2b and M2c in lines L-16, L-17 and L-18, respectively, which are closed at various intervals as the timer operates.

The normally open timer contacts M2a are connected in line L-16 with the normally open limit switch contacts LS-5a of a limit switch LS-5 which is located adjacent the male mold 29 and is actuated by the mold box frame 32 when it is in the operative molding position. The contacts M2a and limit switch contacts LS-5a are connected in series circuit relation with a solenoid 170 of a Johnson poppet type valve 170a manufactured by Johnson Corporation, of Three Rivers, Michigan, which, when actuated, is operable to connect the ports 30 in the male mold 29 with a source of vacuum (not shown). After a part has been formed in the sheet of plastic P, the timer contacts M2a open and the timer contacts M2c in line L-18 close to energize a solenoid 172 connected in line L-18 which operates the valve 170a that disconnects the ducts 30 in the male die 29 from the vacuum source and connects them with a source of air to eject the part formed away from the male mold 29. Prior to the contacts M2c closing, the contacts M2b in line L-17 closed to energize the armatures 58a of the fan motors 58 which draw air through the pivotal doors 60 to cool the part thus formed. The heater elements 130 are connected across the source in line L-19.

THE OPERATION

With the mold box frame 32 in the position shown in FIG. 1, a sheet of plastic P is placed on the flange portion 38 of the mold box frame 32 and the start switch members S1 through S4 are manually closed. When the switch S1 is closed, the clamp solenoid 40' is energized to direct air to the cylinder 40 in such a manner as to move the clamp bars 44 to the position shown in FIG. 7 to clamp the edge portions of the sheet P between the bar 44 and the flanges 38.

As soon as the starting switch S2 is closed, the electric eye EE is energized to close the contacts EE1 in line L-9 to energize the solenoid 164 so as to direct air through the ports 72 to move the sheet P upwardly off the cross members 82 to the chain line position shown in FIG. 3. When the sheet P is billowed upwardly, the light beam 162 is interrupted to cause the contacts EE1 to open. At This time, the sheet P is wrinkled, however, when the heating assembly 24 is moved into superposed relation with the carriage 32 to heat the sheet P, the increased temperature of the billowing air will expand and pressurize the entrapped air which forces the sheet P outwardly until it is smooth.

Figure 5:
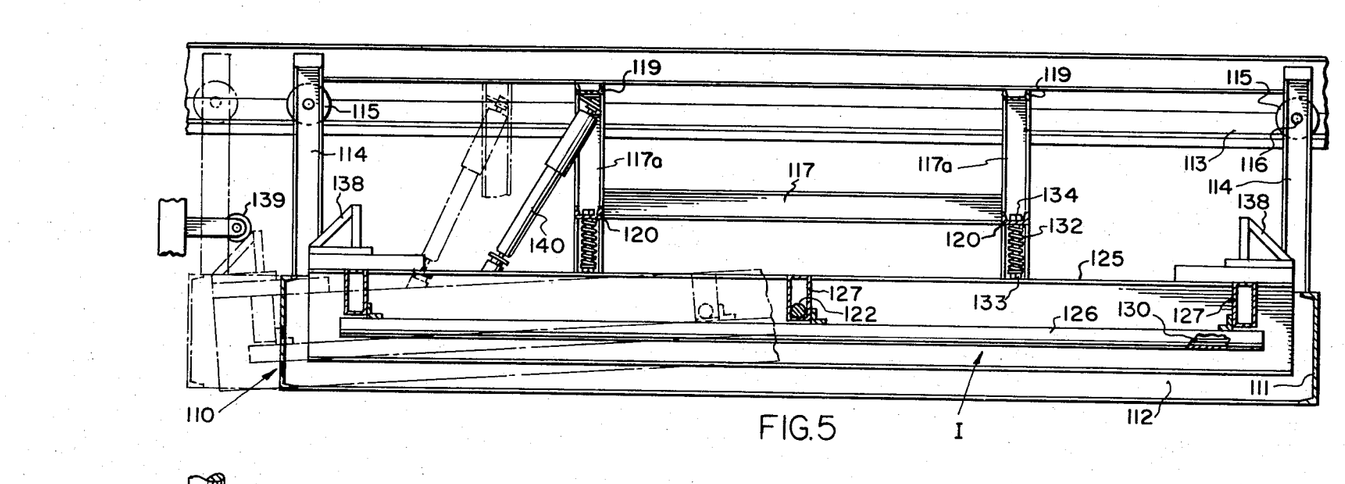
FIG. 5 is a section front view, particularly illustrating the heating apparatus, which is taken along the line 5—5 of FIG. 2.

With the closing of the switch S2, the clutch coil CL1 is energized to close the contacts CL1a and CL1b in line L-6 to start the heating timer M1. With the mold box frame 32 in the lowermost position to actuate the limit switch LS-2, the limit switch contacts LS-2a in line L-12 are closed to energize the solenoid 152a when the timer contacts M1b of the timer are closed. When the solenoid 152a is energized, the piston 152 is operable to move the heating assembly 24 from the solid line position shown in FIG. 1 to the chain line position, also shown in FIG. 1. When the carriage 24 is moved to the far left position as shown in FIG. 5, the inclined ramps 138 will engage the rollers 139 on the frame F, causing the heating oven 24 to tilt about the shaft 122 to the chain line position shown in FIG. 5. When the sheet P has been heated for a sufficient time, i.e., 25 seconds, the timer contacts M1b open and the switch arm 165 of the timer contacts M1a moves into engagement with the fixed contact 168 to energize the solenoid 152b in line L-14 through the contacts LS-3a which are closed when the heating assembly moves to the forming station 18. When the solenoid 152b is energized, the heating assembly 24 returns to the solid line position shown in FIG. 1 where it is halted when the limit switch contacts LS-3a open.

When the heater assembly 24 returns to the solid line position shown in FIG. 1, the timer contacts M1c close to energize the raise solenoid 98a of the cylinder 98 to move the frame 32 from the position shown in FIG. 1 upwardly to a molding position adjacent the male mold 29. As the frame is moved upwardly the center portion of the sheet P will first engage the bottom of the male mold 29 and then the portion of the sheet radially outward of the center portion will be rolled or draped upwardly against the bottom of the male mold, thereby eliminating any voids and the formation of air pockets between the sheet P and the plastic male mold member 29. When the mold box 32 reaches its uppermost position so that the sheet P is in sealing engagement with the male mold member 29, the limit switch contacts LS-5a are closed in line L-16. In the interim, the clutch coil CL2 has been energized to close the contacts CL2a in line L-10 and initiate the forming timer M2. After the contacts LS-5a close, the timer contacts M2a in line L-16 close to energize the vacuum forming solenoid 170 which will connect the ducts 30 with a source of vacuum so as to form the part against the male mold 29. As the carriage 32 is moved upwardly to the forming position, the cam rollers 78 engage cams 79 on the frame F to move the side doors 92 and bottom doors 60 from the solid line positions shown in FIGS. 6 and 7 to the chain line positions shown in FIGS. 6 and 7. After the timer contacts M2a have been closed, the contacts M2b closed to energize the armatures 58a of the motors 58 so as to direct cooling air through the open doors 60, against the part formed, and thence through the open doors 92. After the part has been sufficiently cooled, the contacts M2c close to energize the solenoid 172 which disconnects the ducts 30 from the vacuum source and connects them with a source of pressurized air for directing air through the ports 30 so as to eject the part from the male mold 29. As the contacts M2c are closed, the contacts M1c in line L-15 are opened to deenergize the solenoid 98a and permit the carriage 32 to be lowered under its own weight. As the carriage 32 lowers, the rods 80 are also lowered until such time as the stops 81 engage the channel frame members 11a to interrupt movement of the rods 80. The male box frame 32 continues to move downwardly, however, and the cross members 82 engage the bottom of the part formed to move the part upwardly relative to the frame 32. At this time, the limit switch LS-1 is actuated to open the contacts LS-1a in Line L-3 to deenergize the solenoid 45 in line L-5, thus moving the cylinders 40 and clamping bars 44 to their inoperative positions, permitting the part and sheet P to be removed from the clamp box 32. The complete cycle, when forming a part in a sheet 0.080 inches thick, takes approximately 40 seconds.

It should be understood, of course, that when the clamp box 32 is moving upwardly, the heating oven 24 was moving to the forming station 20 to heat the sheet of plastic supported on the male mold box frame 32'. The sequence of operation for forming a part at station 20 is the same as that described above for forming a part at station 18. When the box 32 reaches its lowermost position, the switches S1-S4 are opened and the system is in position so that the operation can again be repeated.

It is to be understood that the drawings and descriptive matter are in all cases to be interpreted as merely illustrative of the principles of the invention, rather than limiting the same in any way, since it is contemplated that various changes may be made in various elements to achieve like results without departing from the spirit of the invention or the scope of the appended claims.

I claim:

1. Differential pressure thermoforming apparatus comprising:
   support means;
   first and second laterally spaced sheet supporting box frame means on said support means each including means for supporting the edge portions of a sheet of thermoplastic material;
   first and second differential pressure mold means on said support means in juxtaposition with said first and second sheet supporting box frame means for forming shapes in sheets of thermoplastic material;
   means on said support means for alternately relatively moving said first and second sheet supporting box frame means and said first and second mold means, respectively, between removed positions and operative molding positions so that sheets of thermoplastic material on said first and second sheet supporting box frame means are brought into engagement with said first and second mold means to mold shapes in said sheets;
   means for alternately introducing fluid under pressure to said first and second sheet supporting box frame means to support the mid-portions of the heated sheets on said first and second sheet supporting box frame means as said first and second sheet supporting box frame means and said first and second mold means, respectively, are relatively moved to said operative molding positions; and
   heating means movable on said support means alternately to a first position between said first sheet supporting box frame means and said first mold means in said removed positions and a second position between said second sheet supporting box frame means and said second mold means in said removed positions to heat sheets of material supported on said first and second box frame means, respectively, and while the mid-portions of said sheets are supported by said pressurized fluid.

2. The differential pressure thermoforming apparatus as set forth in claim 1 wherein said pressurized fluid introducing means is operative to billow the mid-portions of clamped sheets outwardly away from said sheet supporting means in a direction toward said mold means.

3. The differential pressure thermoforming apparatus as set forth in claim 2 including sensing means for sensing the position of the billowed mid-portion of said sheets; and means responsive to said sensing means for interrupting said pressurized fluid introducing means when said sheets are billowed outwardly a predetermined distance in a direction away from said sheet supporting box frame means.

4. The differential pressure thermoforming apparatus of claim 1 wherein each of said sheet supporting box frame means defines a space spanned by a sheet supported thereon; said pressurized fluid being admitted to said spaces; and means for introducing cooling air to said spaces to cool shapes molded in said sheets.

5. The differential pressure thermoforming apparatus of claim 4 wherein each of said sheet supporting box frame means includes exhaust port means; means for opening and closing said exhaust port means; and means for moving said exhaust port opening and closing means to an exhaust port opening position so that the cooling air introduced to said spaces may be exhausted through said exhaust port means.

6. The differential pressure thermoforming apparatus of claim 1 wherein each of said first and second sheet supporting box frame means defines a space spanned by a sheet supported thereon; and including means disposed in said spaces and being movable relative to said sheet supporting box frame means for supporting the mid-portions of said sheets when said box frame means and said mold means are in said removed positions and for ejecting the parts formed in the sheets from the mold box frame means when said mold box frame means and said mold means are moving from said operative molding positions to said inoperative removed positions.

7. The differential pressure thermoforming apparatus of claim 6 wherein said means for supporting and ejecting comprises a plurality of load assist bars disposed in each space and being movable relative to said box frame means; said pressurized fluid introducing means being operable to lift the mid-portions of the sheets of material upwardly away from said load assist bars.

8. The differential pressure thermoforming apparatus as set forth in claim 1 wherein means is provided on said support for reorienting said heating means relative to said first and second sheet supporting means when said heating means is in said first and second positions, respectively, so that the portions of the sheets of thermoplastic on said first and second frame means remote from said second and first mold means respectively, are nearer to the heating means than the portions of the sheets on said first and second frame means closest to said second and first mold means respectively.

9. Differential pressure thermoforming apparatus comprising:
   a frame;
   sheet supporting means for supporting sheets of thermoplastic material;
   mold means on said frame disposed in juxtaposition with said sheet supporting means for forming parts in the sheets supported thereon;
   heating means for heating said sheets supported by said sheet supporting means;
   means mounting said sheet supporting means and said heating means for relative movement between laterally adjacent positions, in which said heating means is positioned laterally adjacent on lateral side of said sheet supporting means, and juxtaposed positions;
   means for relatively moving said sheet supporting means and said heating means between said laterally adjacent positions and said juxtaposed positions;
   means for automatically tilting said heating means in said juxtaposed position so that said heating means is nearer to the portion of the sheet adjacent the laterally opposite side of said sheet supporting means than to the portion of the sheet adjacent said one side of said sheet supporting means so that the sheet of thermoplastic material is heated to a uniform temperature; and
   means for relatively moving said sheet supporting means and said mold member when said heating means is in said adjacent position to move a heated sheet into engagement with said mold member to form a part.

10. The differential pressure thermoforming apparatus of claim 9 wherein said heating means is pivotally mounted on said frame and said tilting means comprises cooperating cam means and cam follower means positioned on said heating means and said frame which cooperate when said heating means and said sheet supporting means are in juxtaposition to pivot the heating means relative to said frame.

11. The apparatus set forth in claim 9 wherein said mold means comprises first and second laterally spaced differential pressure mold members and said sheet supporting box frame means comprises laterally spaced first and second sheet supporting box frames in juxtaposition with said first and second mold members, said means for relatively moving said sheet supporting means and said heating means comprises means for moving said heating means alternately to a first position between said first mold member and said first sheet supporting box frame and a second position between said second sheet supporting box frame and said second mold member to heat sheets supported on the first and second box frames respectively.

12. The differential pressure thermoforming apparatus of claim 10 wherein said heating means comprises resilient centering means on opposite sides of the pivotal mounting for yieldably urging said heating means to a position parallel with a sheet on said sheet supporting means, said cooperating cam means and cam follower means being operable to swing said heating means about said pivotal mounting when said heating means and said sheet supporting means are in said juxtaposed positions.

13. The differential pressure forming apparatus as set forth in claim 11 wherein said heating means includes a carriage and a plurality of heating elements on said carriage; said means for relatively moving said sheet supporting means and said heating means includes means for moving said carriage from a position laterally adjacent said sheet supporting means to a superposed position with said sheet supporting means.

14. The differential pressure forming apparatus as set forth in claim 13 wherein said means for relatively moving said mold means and said sheet supporting means comprises rack means mounted on said support, and sprocket means disposed on opposite sides of said box frame drivingly connected to each other and in driving engagement with said rack means.

15. Differential pressure thermoforming apparatus comprising:
support means;
sheet supporting box frame means on said support means for supporting the edge portions of a sheet of thermoplastic material and having sides defining a space spanned by a sheet supported thereon;
differential pressure mold means mounted on said support means for forming a shape in said sheet of thermoplastic material;
means on said support means for moving said sheet supporting means from a removed position to an operative shape forming position adjacent said mold means whereby said sheet is moved into engagement with said mold means to form a shape and for returning said sheet supporting means to said removed position to withdraw the shape from said mold means; and
means disposed in said space between the sides of said box frame means for supporting the mid-portion of said sheet when said box frame means is in said removed position and for ejecting a shape formed in the sheet from said box frame means when said box frame means is moving from said operative shape forming position to said removed position.

16. The differential pressure thermoforming apparatus of claim 15 wherein said means for supporting and ejecting comprises a plurality of load assist bars disposed in said space and being movable relative to said box frame means.

17. Differential pressure thermoforming apparatus comprising:
support means;
a sheet supporting box frame on said support means for supporting a sheet of thermoplastic material and defining a space spanned by said sheet of material, said frame including an exhaust opening communicating with said space;
closure means for said exhaust opening movable between an open position uncovering said exhaust opening and a closed position so as to cover said exhaust opening;
differential pressure mold means on said support means for forming a shape in a sheet of thermoplastic material supported on said sheet supporting box frame;
means for relatively moving said sheet supporting box frame and said mold means between removed inoperative positions and adjacent operative molding positions to form a shape in said sheet of material; and
means for cooling a shape formed in said sheet comprising means for introducing cooling air into said space and means for moving said closure means from said closed position to said open position to permit the cooling air admitted to said space to be exhausted through said exhaust opening.

18. The differential pressure thermoforming apparatus as set forth in claim 17 including means yieldably urging said closure means to said closed position.

19. The differential pressure thermoforming apparatus of claim 18 wherein said closure means comprises a door pivotally mounted on said sheet supporting box frame; said means for moving said closure means comprises cooperating cam means and cam follower means connected with said door and said support means for pivoting said door to said open position when said sheet supporting box frame and said mold means are in said operative molding position against the force of said yieldable means.

20. The differential pressure thermoforming apparatus as set forth in claim 17 wherein said sheet supporting box frame includes a cooling air inlet opening; and means for said inlet opening selectively movable between an open position removed from said inlet opening and a closed positions so as to cover said inlet opening; said means for introducing cooling air includes means for moving said second closure means between said closed and open positions; and fan means for drawing cooling air into said space when said second closure means is in said open position.

21. The differential pressure thermoforming apparatus as set forth in claim 20 wherein said means for selectively moving said second closure means to said open position to permit cooling air to enter through said inlet opening comprises a door pivotally mounted on said sheet supporting box frame, and cooperating cam means and cam follower means mounted on said box frame and said support means cooperating to move said door to said open position when said box frame is in said operative position.

22. The differential pressure thermoforming apparatus as set forth in claim 21 wherein said means for moving said first mentioned closure means is movable simultaneously with said means for moving said second closure means and comprises a shaft connected with said means for moving said first mentioned closure means and said second closure means to simultaneously move said first mentioned closure means and said second closure means to their open positions.

* * * * *